United States Patent [19]

Allen, Jr. et al.

[11] 4,347,569
[45] Aug. 31, 1982

[54] WHEEL SLIP SYSTEM

[75] Inventors: John J. Allen, Jr., Watertown; Bruce W. Shute, Henderson Harbor, both of N.Y.

[73] Assignee: General Signal Corporation, Stamford, Conn.

[21] Appl. No.: 177,347

[22] Filed: Aug. 12, 1980

[51] Int. Cl.³ .......................... G06F 15/20; G01P 3/48
[52] U.S. Cl. .................................. 364/426; 180/197; 303/96; 318/52
[58] Field of Search ..................... 364/426; 318/52; 303/91, 95, 96, 103; 180/197

[56] References Cited

U.S. PATENT DOCUMENTS

| | | | |
|---|---|---|---|
| 3,519,805 | 7/1979 | Thorne-Booth | 364/426 |
| 3,640,586 | 2/1972 | Kohler | 303/96 X |
| 3,912,034 | 10/1975 | Pallof | 303/96 X |
| 4,005,838 | 2/1977 | Grundy | 364/426 X |
| 4,042,810 | 8/1977 | Mosher | 105/61 X |
| 4,071,282 | 1/1978 | Callahan et al. | 303/96 X |
| 4,080,007 | 3/1978 | Acker et al. | 303/104 |
| 4,095,147 | 6/1978 | Mountz | 180/197 X |
| 4,107,253 | 8/1978 | Borg et al. | 364/426 X |
| 4,134,621 | 1/1979 | Smedley et al. | 303/96 |
| 4,164,872 | 8/1979 | Weigl | 303/96 X |
| 4,184,203 | 1/1980 | Skarvada | 364/426 |
| 4,267,575 | 5/1981 | Bounds | 364/426 X |

*Primary Examiner*—Jerry Smith
*Attorney, Agent, or Firm*—Thomas R. FitzGerald; Jeffrey S. Mednick; Perry Palan

[57] ABSTRACT

A microprocessor controlled wheel slip system for a train of railway cars receives wheel speed data, calibrates that data in accordance with a predetermined set of instructions, and indicates when a pair of wheels on an axle of a given car is slipping or spinning relative to the other wheels on the other cars of the train.

18 Claims, 7 Drawing Figures

WHEEL SLIP SYSTEM

BACKGROUND

This invention is generally directed towards a brake control system, and, in particular, toward a wheel slip detection and correction system for operation in conjunction with a railway propulsion and braking system.

Wheel slip is a recurring problem in the operation of railway cars. Wheel slip occurs when the force applied to a wheel exceeds the frictional forces that hold the wheel in contact with the rail. When the applied force exceeds such frictional forces, the wheel tends to slip. Slip is defined as the wheel's rotation on its axle with relative motion existing between the wheel and the rail at the area of contact. If the slipping condition is not quickly corrected, the wheel may begin to slide or spin. Slide is defined as the wheel not rotating on its axle with relative motion existing between the wheel and the rail when the brakes are applied. Slide is more commonly referred to as wheel lockup. Spinning is the equivalent of sliding during the propulsion mode of operation. Hence, when the propulsion force applied to a wheel is greater than the frictional forces holding the wheel to the rail, the wheels tend to first slip and then spin. Hence, spinning is defined as the wheel rotating on its axle with relative motion existing between the wheel and the rail at the point of contact.

Wheel slip is undesirable for several reasons. It reduces the effective control of the railway car to the extent that the operator is no longer fully in control of the motion of the vehicle. Such a situation is obviously unsafe, and is particularly so during the braking mode of operation. It is believed that the effective braking force of a sliding or slipping wheel is substantially less than the braking force of a wheel that is in normal adhesion with a rail. Hence, when a wheel slips or slides, the braking effort is correspondingly reduced. Such a reduction in braking effort is an obvious hazard. In addition, a sliding wheel tends to acquire flat spots where the wheel slides over the rail. Such flat spots deform the circumference of the wheel. Such deformed wheels are believed to be the case of undesirable vibrations in the railway car. Such vibrations are uncomfortable to passengers and may be damaging to freight. In addition, such deformed wheels ultimately will have to be replaced or resurfaced, at a considerable expense to the railroad.

In the past, there have been a number of attempts to sense and correct wheel slip. These attempts have included mechanical means for sensing a slipping wheel and releasing the brake on the wheel. Such mechanical means have, however, required a considerable amount of maintenace and thus have not been widely accepted. More recently, there have been proposed solid state, electrical analog means for sensing and correcting wheel slip. The disadvantage of such devices, however, is that they too require a considerable amount of maintenance. In particular, one problem of such electrical analog means is the drift inherent in the individual electronic components. A typical analog control circuit for wheel slip requires numerous settings of various bias voltages on different components. In addition, such components have to work in the hostile environment of a railway vehicle and thereby are subject to vibration, heat, cold, dust, and other adverse factors which tend to cause the components to drift from their proper settings. As a result, such systems quickly drift from their desired settings and thereby miscorrect for wheel slip.

Since wheel slip is caused by an excessive force on the wheel, it is usually corrected by removing the applied force from the wheel. Hence, when a wheel begins to slip or slide during braking, the slip can be corrected by momentarily releasing the brakes until the normal frictional forces between the wheel and the rail start the wheel to roll once more. Then the brakes can be reapplied to the wheel. A problem with both the mechanical and the analog electronic systems of the prior art is that their detection and correction for wheel slip was inconsistent and unreliable. Hence, such prior art systems were sensing and correcting for wheel slip when no slipping was occurring. Accordingly, the brakes were being released under normal operating conditions thereby presenting a hazard and a nuisance.

It is believed that many of the problems of the prior art systems arose out of the inability of those systems to compensate for variances in wheel diameters due to the wear and the replacement of the wheels. Obviously, wheels with different diameters will turn at different speeds, even if there is no slipping between the two wheels. Unless such differences can be calibrated into the detection system, then the system will detect a difference in the speed of the two wheels. Such a differential speed will normally be taken by a system as an indication of a slipping wheel.

Another problem with the systems of the prior art has been their inability to detect erroneous readings from axle speed sensors. Hence, if the sensor was generating an erroneous speed signal, the prior art would interpret such an erroneous signal as a slip or a slide.

Another disadvantage of systems of the prior art was their inflexibility to changes. Hence, wheel slip systems of the prior art were generally specially designed for one and only one set of criteria to determine slide or slip. If those criteria were changed, then the entire wheel slip system had to be accordingly modified.

SUMMARY

It is an object of this invention to improve the stopping performance of a railway car during slide conditions.

It is another object of this invention to reduce maintenance costs and eliminate flat spots due to sliding.

It is a feature of this invention to automatically calibrate itself during coasting in order to compensate for variances in wheel diameters due to wear and replacement of the wheels.

Another feature of this invention is the automatic detection of erroneous axle readings in the event of sensor failure.

It is an object of this invention to automatically detect and correct for synchronous as well as asynchronous slides.

It is a feature of this invention that the criteria for determining slip and slide can be readily changed.

Still another feature of this invention is the provision of time-delay relays for automatically reapplying released brakes after a predetermined amount of time in the event of component failure.

The invention is a wheel slip control apparatus that includes a microprocessor for receiving wheel speed data, calibrating that data in accordance with a predetermined set of instructions, and indicating when a wheel is slipping with respect to other wheels based upon the data and the stored instructions. More particularly, the invention includes an apparatus and a method for determining when the wheels of a railway car are slipping. The wheel slip control apparatus includes a microprocessor which has input means for receiving a rate (speed) signal from a plurality of sources, such as the axles of the railway car. A clock in the microprocessor periodically samples the input rate signals. The memory portion of the microprocessor stores the sample input rate signals.

The microprocessor also has means for receiving signals indicating when the car is operating in the braking or the running mode. Based upon those received signals, the microprocessor can determine whether the car is braking, running, or coasting. Logic means are provided in the microprocessor for calibrating a set of stored input rate signals in order to derive a normalization factor for each signal in the selected set. That normalization factor can be applied to future rate signals in order to calibrate those signals and thereby compensate for variations in the wheel size diameter. The microprocessor also includes means for comparing the normalized rate signals of one set with normalized rate signals of another set in order to determine whether the normalized rate signals differ from one another by a predetermined amount thereby indicating a slipping condition.

More particularly, during coasting, the wheel slip system compares all speed inputs, and if one of the readings is significantly different from the others, it is considered to be erroneous and is not used in the slip comparisons. All of the other signals are then normalized to compensate for variations in wheel size, and the normalized data are stored in the memory of the microprocessor for calibrating input signals received during braking and power modes. The wheel slip system continuously reacts to acceleration and deceleration rates. After the coasting mode has occurred and the axles have been normalized the system will react to differential velocities. The latter is necessary so that differences in wheel diameter will not cause erroneous slip or spin indications.

During braking, current speed values are compared to each other and to previous values. If the difference between the highest and the lowest current speed value is above a predetermined level (preferably two miles per hour) or the rate of change from previous reading to current values (acceleration or deceleration) is too great, then a slip or slide condition is assumed. The microprocessor decides which axle is sliding and simultaneously energizes the appropriate relays. In the braking mode, one relay will release the brakes, and another may optionally energize a slip indication. The microprocessor keeps track of the length of time that each brake is released. If the slide is not corrected within three seconds, the relays for the affected truck are de-energized and the brakes are reapplied. The brakes will not be released on that truck by the microprocessor again until the car has gone into a propulsion mode. If the slide is corrected within the time limit, the brakes are reapplied and any additional slips will be corrected for. During the power mode, if a spin occurs, the wheel slip system will energize a relay indicating that an axle is spinning. At that point the operator can take appropriate action, such as applying sand to the rail or reducing the propulsion applied to the spinning wheel. Circuitry may also be connected to the indicator relay which will inhibit the operator from applying more power until the spin has corrected.

Having thus summarized the salient features of the invention, further attention is directed to the following written description where the best mode contemplated for carrying out this invention is described in detail, and also to the accompanying drawings wherein:

DETAILED DESCRIPTION

Figure 1:
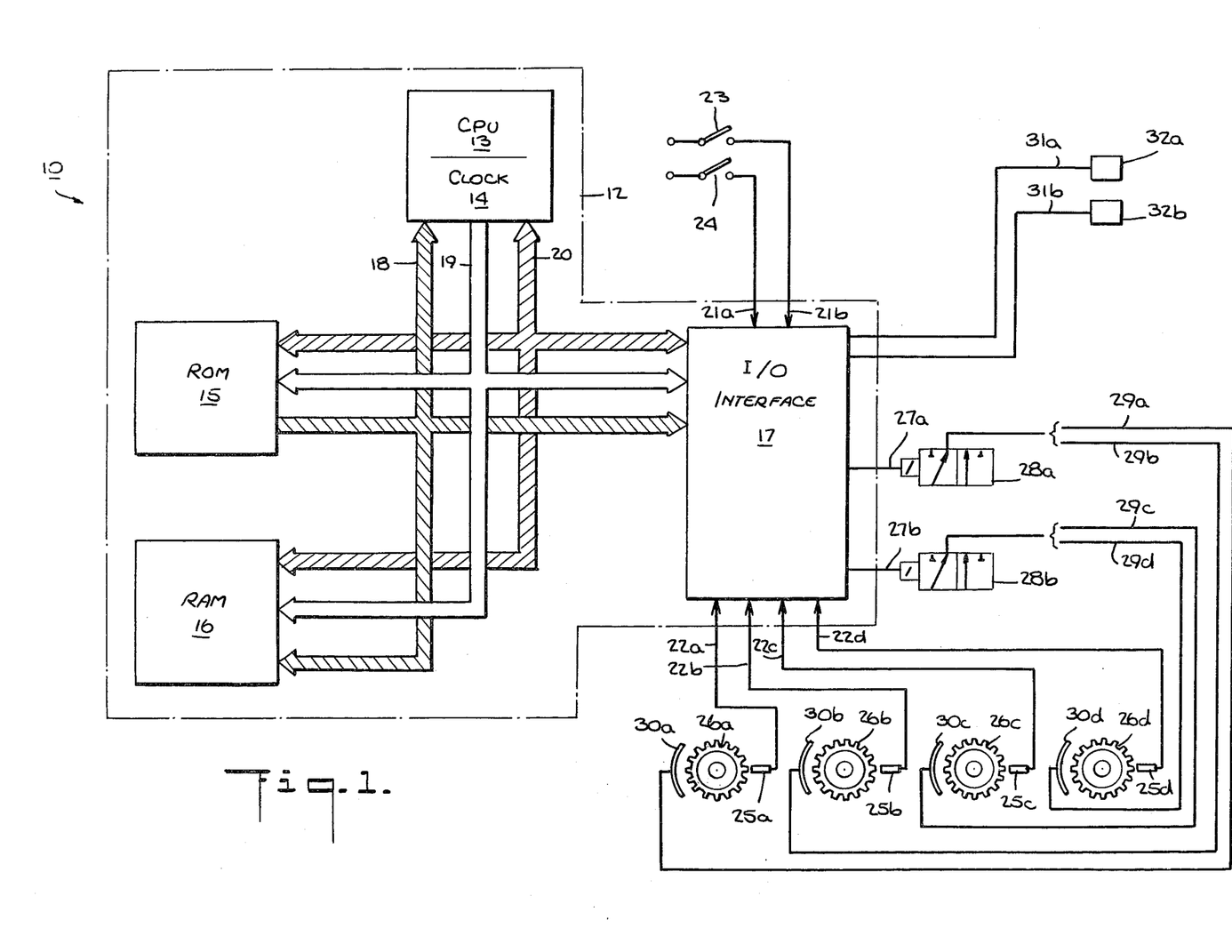
FIG. 1 is a schematic diagram of the microprocessor, controlled wheel slip system.

In FIG. 1, there is shown a wheel slip control system 10. The system includes a microprocessor 12 which is capable of receiving a plurality of input signals via inputs 21 a, b, and 22 a, b, c, d. These inputs are respectively indicative of the mode of operation of a railway car, i.e., either the running (propulsion) mode or the braking mode. A braking mode signal can be generated by any suitable means, such as a braking switch 24 which is closed when the brakes of the car are applied. In a similar manner, a propulsion mode signal can be generated by a propulsion mode switch 23. The railway car (not shown) includes a pair of trucks X, Y. Each truck has two axles with wheels mounted on the ends thereof. Hence, for the railway car there are four axles designated 26 a, b, c, d. Operatively associated with each of those axles is a magnetic sensor 25 a, b, c, d which is pulsed each time a gear tooth passes beneath the sensor. Hence, there is a signal impressed upon inputs 22 a, b, c, d representative of the rate or speed of each axle. The microprocessor 12 has a plurality of outputs 27 a, b which can be used to operate solenoid-controlled dump valves 28, a, b. The dump valves, in turn, control the operation of the brakes 30 a, b, c, d via control lines 29, a, b, c, d.

The microprocessor (MPU) 12 comprises of four main components, including a central processing unit (CPU) 13, a read only memory (ROM) 15, a random access memory (RAM) 16, and an input/output interface unit 17. Those four components are operatively connected to each other via a data bus 18, an address bus 19, and a control bus 20. The CPU 13 also includes a clock 14 for timing the various operations to be performed by the microprocessor 12. The ROM 15 contains a set of permanently stored data and instructions for operating the microprocessor. Such instructions are commonly designated as a program which shall be explained in further detail hereinafter with reference to the functional flow charts particularly shown in FIGS. 2 through 7.

In operation, the magnetic sensors 25 a, b, c, d detect the speed of each of the four axles 26, a, b, c, d. These signals are provided to the input/output interface 17 of the microprocessor 12. Run or brake signals indicating that the car is respectively under propulsion or braking, are provided by switches 23, 24 via input lines 21 a, b. Based upon the given inputs, the central processing unit 13 can determine when the car is running, braking, or coasting at a given speed. During the coasting mode of operation, the microprocessor 12 is programmed via ROM 15 to check each sensor for any erroneous inputs. Erroneous sensor signals are detected by comparing each sensor reading to a predetermined tolerance. If the variation between any two sensors is greater than the predetermined tolerance, the erroneous sensor is flagged by the microprocessor and further readings from that sensor are ignored.

After such errors have been detected, the correct rate signals of the sensors are calibrated. The calibration technique employed by the microprocessor 12 includes the selection of one, non-erroneous axle rate as a standard and deriving a normalization factor equal to the chosen rate divided by the individual rate for each sensor. For example, if the four axles 26 a, b, c, d read speeds of 10, 11, 12, and 13, respectively, then the normalization factors will be, respectively, 10÷10 which is equal to 1, 10÷11 equal to 0.91, 10÷12 equal to 0.83, and 10÷13 equal to 0.77. Such normalization factors are calculated only during the coasting mode. It is during that mode that it is known all the wheels are turning without any slipping or sliding. Hence, any variations in the wheel speeds will be due to the variations in the geometries of the different wheels. All of the wheels are, in effect, set to one, normalized speed and future readings for each axle multiplied by the axle's normalization factor in order to maintain the same relationship among the four axles.

During the braking mode of operation, the microprocessor 12 checks for two potential types of slipping and sliding situations, synchronous and asynchronous slides. An asynchronous slide or slip occurs when the speed of one axle is significantly slower when compared to the speeds of the other axles. Any differential can be chosen as a criterion to determine asynchronous slip; however, it is preferred to use two miles per hour. Hence, during the braking mode of operation, the microprocessor 12 normalizes the speed signals generated by the magnetic sensors and compares all of the signals to each other to determine which, if any, signals vary by more than two m.p.h. If so, the slower axle is identified and the brakes on that axle are released until the slip is corrected.

As a safety feature, a clock 14 in the microprocessor keeps track of the time that any brake is released. If the brake is released for more than a predetermined time, the clock 14 will signal the CPU 13 which, in turn, will generate a further signal transmitted through the input-/output interface 17 to the brake valves 28 a, b to reapply the released brake. The latter feature is important in case the microprocessor 12 should erroneously calculate a slip condition (i.e. a speed sensor failure). In such an event, the brakes would not be released for more than three seconds.

The microprocessor 12 is also capable of detecting synchronous slides. A synchronous slide occurs when all of the wheels of a railway car are slipping or sliding together at the same rate. In such a case, the microprocessor makes a further determination of the deceleration of each wheel. The deceleration of each wheel is determined by comparing the last eight speed readings to one another. If the average deceleration of the axles exceeds a predetermined standard, then a synchronous slide condition is presumed and the brakes are released in the same manner as in the case of asynchronous slide. Of course, since all of the axles are sliding during a synchronous slide, all of the brakes are released. Again, though, the brakes are not released for more than the predetermined time, i.e., three seconds.

During the propulsion mode of operation, it is also possible to detect wheels which are starting to slip and those which are synchronously spinning together. Hence, the same type of calculations for velocity and acceleration are performed during the running mode of operation. The detection of either a synchronous or asynchronous slide or spin will energize an indicator relay for an operator of the railway car. Then, based upon that indication, the operator can decide how to correct the slide or spin, such as reducing the propulsive power applied to the wheels or applying sand to the wheels and rails. The input/output interface 17 delivers running slide or slip signals via output lines 31 a, b to indicators 32 a, b. The latter may be any suitable indicating means, such as a flashing light or a buzzer, which are well known to those skilled in the art.

Figure 2:
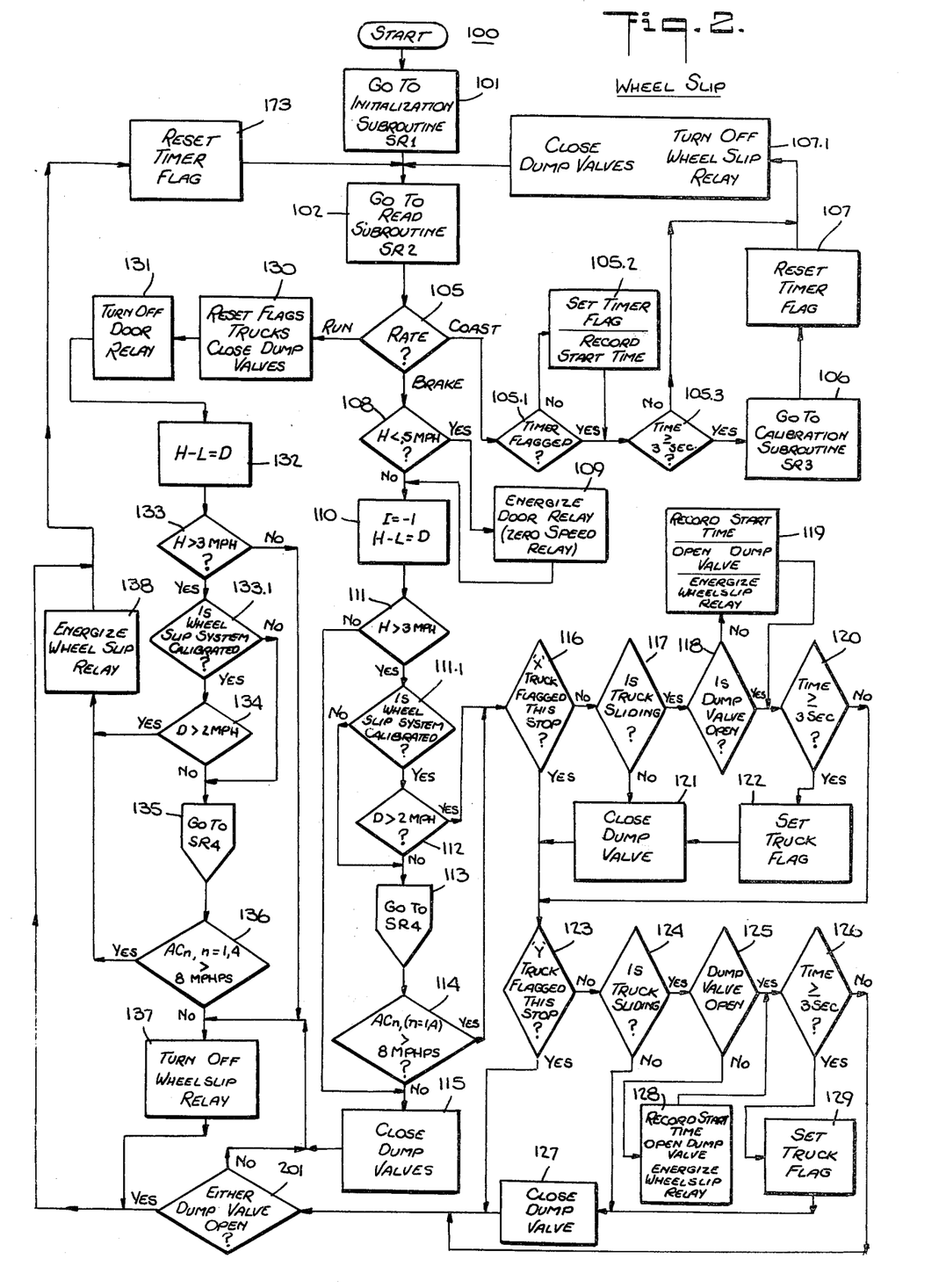
FIG. 2 is a flow diagram of the main portion of the microprocessor program.

Detailed Description of FIG. 2

FIG. 2 is a flow diagram for the main portion of the program which responds to signals received by the input/output interface 17. Such a flow chart generally shows a series of routines to be performed by the microprocessor 12. In addition to the main routine shown in FIG. 2, certain key sub-routines are shown in the remaining figures which will be discussed in detail hereinafter. In general, FIGS. 2, through 8 include two types of operations. The diamond shaped boxes indicate a decision-type of operation, and the square shaped or rectangular shaped boxes indicate a functional-type of operation. To this end, once a decision has been made, a subsequent function associated with that decision will be carried out by the microprocessor's central processing unit 13 based upon data and other information supplied by the ROM 15, RAM 16, clock 13, and input-/output interface 17.

The main routine 100 begins with a functional instruction 101 for the microprocessor 12 to go to an initilization sub-routine SR1. Upon completion of sub-routine SR1, the next function 102 is for the microprocessor to go to a read sub-routine SR2. Upon completion of read sub-routine SR2, the next step is to decision point 105 where a decision is made about the mode of operation of the railway car. The railway car may be operating in one of three modes, coast, brake, and run. The decision 105 is made based upon the inputs from the two-mode sensing switches 23, 24, respectively.

Assuming that a decision is made that the car is coasting, the next decision point is 105.1 where a check is made on the status of the clock 14. It is desirable at this point to have the microprocessor 12 delay any further activity until the railway car has been coasting for at least three seconds. This three second delay is needed to allow the axles 26 a, b, c, and d to stabilize themselves. Accordingly, if the clock has not been set, then the MPU 12 will proceed to function 105.2 wherein the clock 14 will be set and the time will be recorded. Otherwise, the MPU 12 will go directly to function 105.3. At decision point 105.3, the MPU 12 will decide if the requisite three seconds has elapsed. If not, then the MPU 12 will recycle itself via 107.1 and 102 to decision point 105. After the three seconds elapsed and the calibration sub-routine SR3 is read, the next step of the MPU 12 will be function 107 which is to reset the three second timer, and then function 107.1 is to close any open dump valves, turn off the wheel slip indicator relays and return via function 102 to decision point 105.

So long as the railway car is coasting, the MPU 12 will continuously recirculate through the aforementioned coasting path. However, when the brakes are applied, decision point 105 will then direct the MPU 12 to decision point 108. At decision point 108, an inquiry is made as to whether or not the highest speed recorded by the magnetic sensors 25 a, b, c, d is less than 0.5 m.p.h. If so, then the next function 109 is to energize a zero speed relay. The next functional operation 110 is to calculate the difference, D between the highest H and the lowest L speeds of the axles 26. Once those speeds have been calculated, the MPU 12 is instructed by decision point 111 to disregard further instructions and to proceed to function 115 and thereby close all of the dump valves, thus reapplying the brakes, if the highest speed is not greater than three miles per hour. Hence, below three miles per hour, the wheel slip controller will not release any brakes regardless of slipping or sliding signals. The latter is an important safety feature for guarding against an erroneous brake release when the train is at the end of a braking operation. Assuming, however, that the high speed is greater than three miles per hour, the next decision 111.1 is to determine if the unit has been calibrated. This is done by checking a flag which is set or cleared during the calibration subroutine. If the unit is calibrated, the next instructure is 112, but if it is not, then function 113 is executed. The latter is an important safety feature for guarding against erroneous brake release due to variations in wheel diameter when the unit is not calibrated.

Assuming, however, that the unit is calibrated the next decision 112 is to determine whether or not the difference between the highest and the lowest speeds measured is greater than two miles per hour. If the difference D is greater than two m.p.h., then it is assumed that one of the axles 26 is undergoing asynchronous slipping or sliding.

The next operation is to determine which axle is slipping and to take the appropriate corrective action. To this end, it should be noted that four axles are divided equally between two trucks which support the body of the railroad car. Hence, axles 26 a and b are on one truck designated truck X and axles 26 c, d are on the other truck designated truck Y. The next step in the program then is to first decide at decision point 116 if truck X has been flagged. By "flagged" it is meant that the dump valve 28a operatively associated with truck X has been at least temporarily taken out of the wheel slip system. Assuming that truck X is not flagged, then the program proceeds to decision point 117 where a decision is made as to whether or not truck X is sliding. Such a decision is made by comparing the speeds of the axles on truck X with the speeds of the axles on truck Y. Since a slipping or sliding axle is turning at a lower than normal speed, the decision made at 117 is whether or not axles 25 a or b are the lower speeds accounting for the two mile per hour differential. If it is determined that truck X is not sliding, then the MPU is functionally directed via 121 to close the dump valve associated with truck X, in the event the valve should be inadvertently open, and to proceed to analyze the speeds of truck Y via decision point 123. However, if truck X is sliding, then the MPU 12 is directed to decision point 118 where it reads a memory location which is used to control dump valve 28a to determine if it is already open. If the dump valve is not open, the next function 119 includes energizing the wheel slip relay via line 27a to open dump valve 28a and to start a three second timer contained in clock 14. Thereupon the program moves to the next decision point 120 to determine if the three seconds timed by clock 14 have elapsed. If the three seconds have elapsed and the dump valve 28a is still open, then it is presumed that the sensor signal indicating a slip condition is either erroneous, or that the slip condition is uncorrectable within the three second time limit. Thereupon, the next function 122 is to "flag" truck X in order to prevent further opening of the dump valve 28a. Hence, a flag will appear at decision point 116 and thus bypass the remainder of the truck X operation. Having set the flag on truck X, the next function 121 will be to close the dump valve 28a if it has not already been closed, and then proceed to decision point 123. At decision point 123, the MPU 12 will proceed with a similar interrogation of the status of truck Y. After the inquiry of truck Y has been completed, the micro-processor will be directed to decision point 201 where it will make a final check to see if either dump valve 28a or b is open. An open dump valve indicates that the slip or slide has not been corrected, and the entire wheel slip interrogation system is restarted via reset timer flag 173. On the other hand, if both dump valves are closed, then the MPU 12 is directed to function via 137 to turn off the wheel slip relay if it has not already done so, and then restart the wheel slip routine.

The foregoing explanation of the interrogation of trucks X and Y applies to instances where asynchronous wheel slip is present. In the case of synchronous wheel slip, i.e. all of the axles slipping or sliding and slowing down at the same rate, the wheel slip detection system 10 measures the deceleration of each axle in order to determine if the deceleration exceeds a certain predetermined value indicative of an asynchronous slipping condition. Hence, if no velocity differential is detected at decision point 112, the MPU 12 is directed by functional direction 113 to go to acceleration sub-routine SR4. The details of that sub-routine will be discussed hereinafter. At decision point 114 the average acceleration (deceleration) of each axle is compared to a predetermined deceleration value of eight miles per hour per second. If a slip or slide condition is detected, then trucks X and Y are operated upon to have their dump valves open in accordance with the foregoing description of asynchronous sliding. Once the synchronous sliding has been corrected, the MPU 12 is functionally directed via 115 to close both dump valves 28 a, b, turn off the wheel slip relay via 137, and reset the program via reset timer 173.

Thus, having described the operation of the system during a coasting and braking mode, it will be readily apparent that a similar operation occurs during the run mode if a run decision is made at decision point 105. Of course, as also mentioned above, the detection of a slip or spin condition during propulsion or running, is not automatically followed by the termination of propulsion to the wheels. Instead, the microprocessor 12 is directed to energize an indicator relay via functional direction 138 in order to turn on the appropriate indicator 32, a, b, to let the operator of the railway car know that one of the two trucks is slipping.

Having thus described the operation of the main wheel slip routine 100, further attention will be directed to the key sub-routines that were referred to above.

Initialization Sub-Routine SR1

Figure 3:
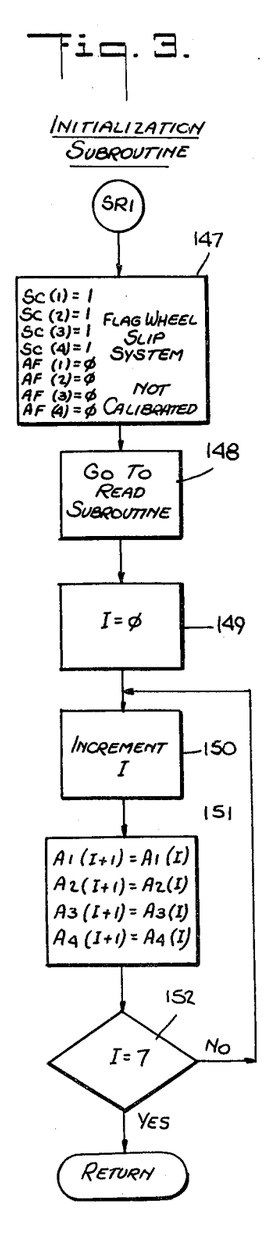
FIG. 3 is a flow diagram of the initialization subroutine.

The purpose of initialization sub-routine SR1 is to provide the wheel slip system 10 with an initial memory of at least eight speed readings for each axle by taking those readings at 0.1 second intervals. Hence, at the end of the initialization sub-routine SR1, the RAM 15 contains at least eight readings from which to make subsequent comparisons to determine wheel slip.

The initialization sub-routine SR1 is started by functional direction 147 to set calibrated speed readings SC for each axle equal to one (1). All axle flags AF, indicative of erroneous axle readings, are set to 0. Next, the MPU 12 is directed via 148 to the read sub-routine SR2. It is through the reading of sub-routine SR2 that the aforementioned eight speed readings, i.e. the most recent eight speed readings, are placed in the RAM 15. Those eight readings are accomplished by the next directive 149 to set a counter I equal to 0 and to increment I until I counts to seven, for a total of eight counts, and then to return to the main program.

The aforementioned axle flags in the initialization sub-routine are initially all set to binary 0 since a flagged axle (indicated by a binary 1) will ultimately be determined by whether or not the speed of the axle exceeds a predetermined tolerance. Such a tolerance is determined by the calibration sub-routine, SR3. However, initially, it is presumed that there are no flags; and hence the initialization sub-routine SR1 sets all axle flags AF to zero.

Read Sub-Routine SR2

Figure 4:
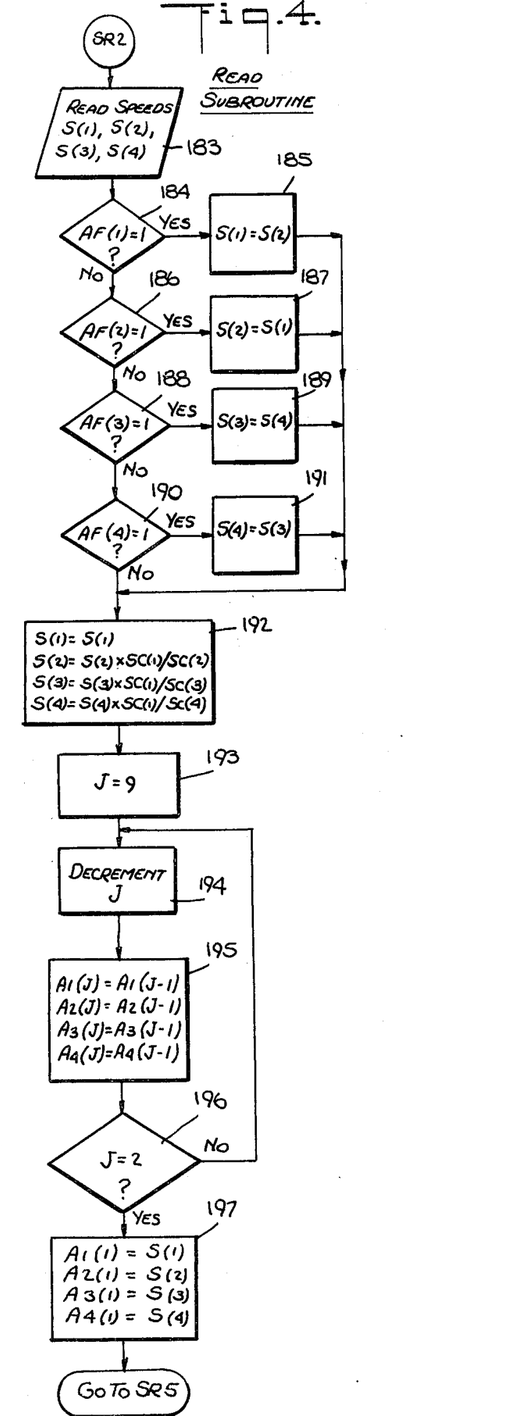
FIG. 4 is a flow diagram of the read subroutine.

One purpose of read sub-routine SR2 is to read the raw speeds S(1), S(2), S(3), S(4) of the corresponding axles 26 a, b, c, d. This function is performed by functional direction 183 which directs the input/output interface 17 to receive speeds readings from the four speed input lines, 21 a, b, c, d. The following four functional directions and decisions 184 through 191, are designed to see if any flags have been set by the calibration sub-routine, discussed hereinafter. If a flag has been set for any one of the axles, AF, then the speed of that axle is ignored and the other axle on the same truck as the flagged axles is set to be read for both axles. Hence, if axle 26a on truck X for some reason is flagged, for example being over tolerance, then the reading from the flagged axle is disregarded and the reading of the other axle is used in its stead for the rate of both axles on the truck. After the flag check has been completed, the microprocessor 12 is functionally directed via 192 to multiply the raw speeds by a normalization factor. The normalization factor is a coasting speed ratio derived from the calibration sub-routine. After the raw speeds have been normalized, they are sequentially stored in the RAM 15 until at least the eight most recent normalized readings have been stored. The latter function is accomplished via counter J, decrement J194, functional directive 195, and decision point 96 which form a do loop. Once the readings for the axles have been taken and normalized, the microprocessor 12 is directed to fast and slow sub-routine SR5.

Find Fastest and Slowest Axles Sub-Routine SR5

Figures 5, 6:
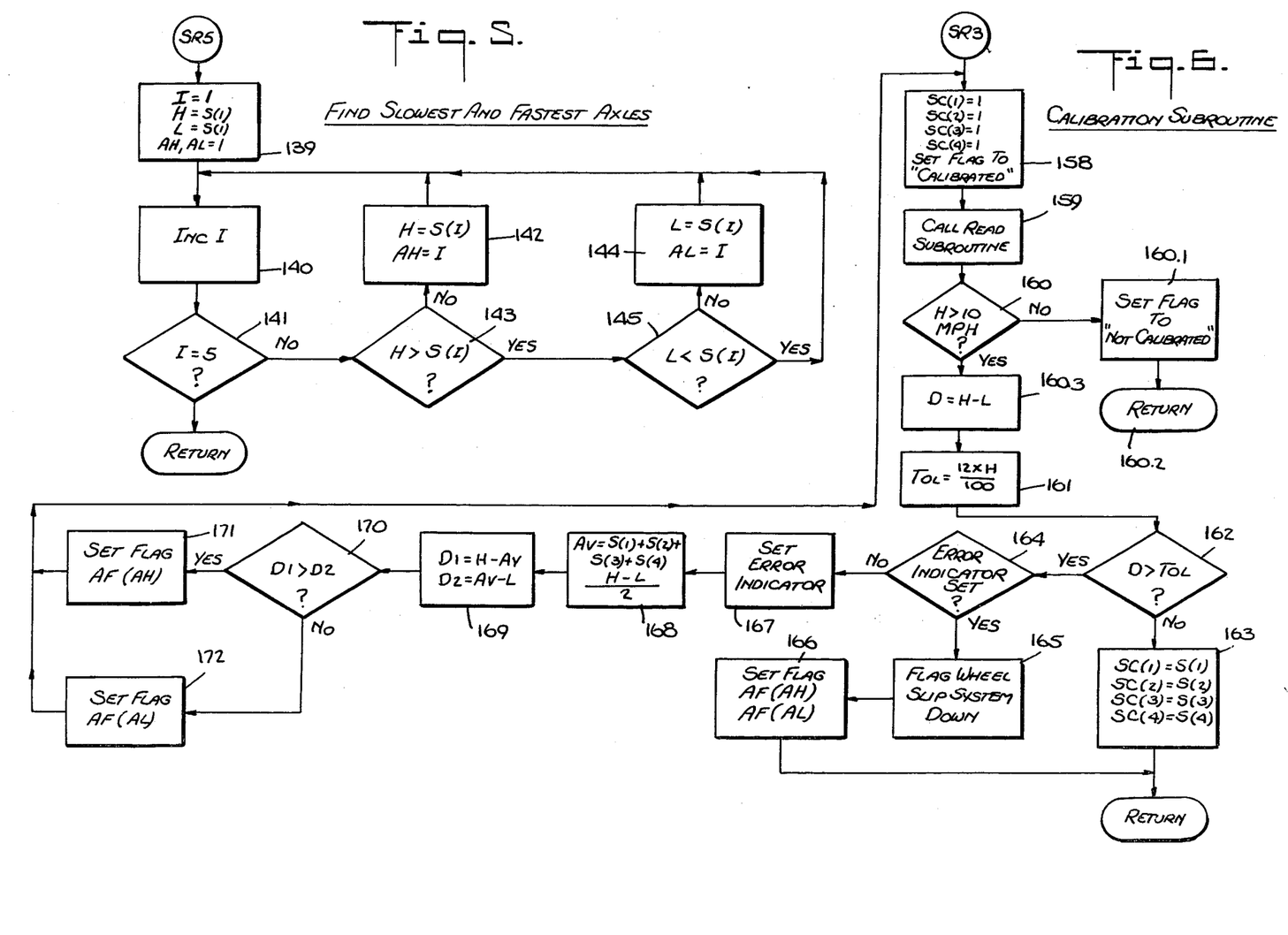
FIG. 5 is a flow diagram of the find slowest and fastest axles subroutine.
FIG. 6 is a flow diagram of the calibration subroutine.

The purpose of this sub-routine is to determine the fastest and the slowest axle speeds and to retain those speeds in the RAM 15 until such time as that information is required in the main sub-routine 100, such as at decision point 108 and functional directive direction 110. In accordance with the instructions of sub-routine SR5, the four speeds are sequentially compared to one another until the highest speed H and the lowest speed L are determined in accordance with the functional steps and decision points 139 through 145. Having obtained the foregoing information on the fastest and slowest axles, the subroutine SR5 returns the MPU 12 to the read sub-routine SR2 which, in turn, brings the microprocessor back to the main routine 100.

Calibration Sub-Routine SR3

Once the main routine 100 has determined that the railway car is coasting, and that three seconds have elapsed to stabilize all equipment, the calibration sub-routine SR3 is enacted. The calibration sub-routine of FIG. 6 begins with a functional directive to arbitrarily set all of the calibrated speeds SC to one. Then, the read sub-routine SR2 is enacted in order to derive a set of raw speeds. From the stored set of raw speeds, the next decision point 160 is to determine if the car speed is above 10 mph. If it is not, then the not calibrated flag is set and then control goes back to the main program. If car speed is above 10 mph then functional directive 160.3 is to determine the difference between the highest and the lowest of all the speeds. Then, the microprocessor 12 is instructed to determine a tolerance by direction 161 equal to 12 percent of the highest speed. At decision point 162, the microprocessor is instructed to decide whether or not the difference between the highest and the lowest raw speeds is greater than the allowable tolerance. If the different speed is equal to or less than the tolerance, then the most recently read raw speeds are used to derive the normalization factor as set forth in read sub-routine S3. However, if the tolerance is exceeded, then the calibration sub-routine determines which axle is above tolerance, i.e. the highest or the lowest, and sets a flag (binary 1) for that axle. The flags set by the calibration sub-routine SR3 are the ones that are considered in the flag check portion of read sub-routine SR2.

Acceleration Sub-Routine SR4

Figure 7:
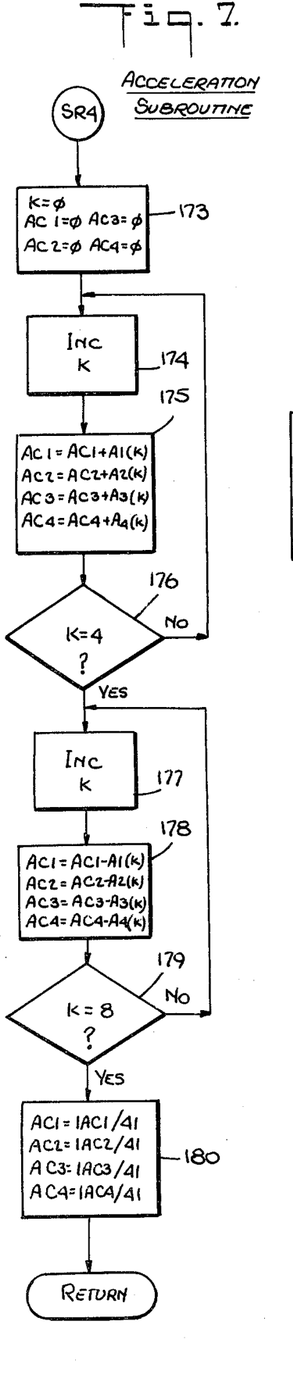
FIG. 7 is a flow diagram of the acceleration subroutine.

The accleration sub-routine SR4 determines the average acceleration of each axle by taking the four most recent calibrated speed readings and comparing them to the four oldest calibrated speed readings. Hence, SR4 initially begins by setting an increment counter K to O via directive 173. Then, through a do loop comprising directive 174 and 175 and decision point 176, the four most recent speeds are read and summed together. Then, another do loop comprising directives 177 and 178 and decision point 179 read the four oldest calibrated speed readings and subtract them from the sum of the four recent speed readings in order to derive the change in velocity over a period of time equal to 0.4 seconds. This is so because the speeds readings are taken 0.1 seconds apart so that the average acceleration or deceleration for eight readings is computed over 0.4 seconds. The latter computation is accomplished by functional directive 180 whereupon the determined accelerations AC 1 through 4 are stored in the RAM for further use by the main sub-routine 100.

Having thus described in detail the operation of the wheel slip system 10, is believed helpful to the reader to give a particular example of how the wheel slip system operates, including the calibration of raw speeds and the determination of the normalization factor.

For purposes of illustration, it shall be assumed that the railway car is coasting and has been coasting for at least three seconds. Accordingly, the wheel slip system 10 is at the threshold of entering the calibration sub-routine. It is further assumed that the most recent speed readings are as follows:

| Axle | Speed at T1 |
|------|-------------|
| 26a  | 19          |
| 26b  | 19          |
| 26c  | 19          |
| 26d  | 20          |

Since the highest speed is 20 miles per hour, the tolerance will be equal to 12 percent of 20 or 2.4 miles per hour. It can be readily seen that the difference between the high and low speeds is well within the tolerance limits; hence, there are no flags. Accordingly, the speeds shown above will be taken as the first set of calibrated speeds.

The normalization factors for the subsequently measured speeds as read in sub-routine SR2 will be as follows:

| Axle | Normalization Factor |
|------|----------------------|
| 26a  | 19/19 = 1            |
| 26b  | 19/19 = 1            |
| 26c  | 19/19 = 1            |
| 26d  | 19/20 = 0.955        |

If the railway car goes into a braking mode, the speeds on the wheels will begin to decrease. As mentioned above, a slipping wheel is detected by an excessive decrease in speed when compared to the other wheels. Further assuming then that the magnetic sensors pick up another set of readings at a time T2 during the braking mode, those subsequently read speeds will have to be normalized in order to be properly compared to one another. Such normalization will occur during the reading sub-routine SR2. It will be seen that the calibration sub-routine is important since the wheels during coasting do not read the same speed. That is, three wheels read 19 miles per hour whereas one wheel reads faster, 20 miles per hour. These difference in speed during coasting can be accounted for by geometrical variations among various wheels. Those variations will remain the same regardless of the mode (run, brake or coast), but must be accounted for when the speed of the axle changes. It is the normalization factor which accounts for these variations.

Thus, during a subsequent reading sub-routine and the course of a braking mode, the following data would be obtained:

| Axle | Sensor Speed at T2 | Normalization Factor | Calibrated Speed |
|------|--------------------|----------------------|------------------|
| 26a  | 12                 | 1                    | 12               |
| 26b  | 12                 | 1                    | 12               |
| 26c  | 12                 | 1                    | 12               |
| 26d  | 10                 | .95                  | 9.5              |

It is readily apparent from observation of the above results that axle 26d at a calibrated speed of 9.5 m.p.h. is sliding or slipping with respect to the other three axles. This is so because the speed of axle d is at least 2.5 m.p.h. different from the other axles thereby exceeding the 2 m.p.h. criterion set at decision point 112. Accordingly, truck X, which includes axles 26 a and b, will not have its dump valve actuated, but truck Y which contains axle 26d will. Dump valve will be opened until the speed differential between axle 26d and the remaining axles is less than the 2 mile per hour criterion or 3 seconds elapses, whichever occurs first.

Having thus described the preferred embodiment of the subject invention, those skilled in the art will appreciate that further modifications and additions may be made thereto without departing from the spirit and scope of the invention as defined in the appended claims.

What I claim is:

1. A method for detecting wheelslip on a railway car comprising the steps of:
   initially measuring the speed of each of a plurality of wheels while the car is coasting;
   determining valid initial measured speeds;
   normalizing the valid initial measured speeds in order to derive a normalizing factor for each wheel;
   subsequently measuring the speed of each wheel from which a valid initial measured speed was determined;
   applying the normalizing factor of each wheel to the corresponding subsequently measured speeds;
   comparing the normalized subsequent speed measurements of the wheels to each other and to previous corresponding normalized speed measurements for each wheel;
   indicating when the compared normalized speeds between wheels differ from each other by more than a first predetermined amount thereby showing that a wheel is slipping and when the compared normalized speeds for each wheel differ by more than a second predetermined amount thereby showing that the wheels are slipping.

2. The invention of claim 1 further comprising the step of releasing a brake from any wheel that is slipping.

3. The invention of claim 2 further comprising the step of reapplying the released brake when the difference in normalized speed between the released wheel and the other wheels is equal to or less than the predetermined difference.

4. A wheelslip control apparatus including a microprocessor comprising:
   input means for receiving a rate signal from a plurality of sources;
   clock means for periodically sampling the input rate signals;
   first memory means for storing sets of the sampled input rate signals;
   calibrating means for selecting one set of stored signals and deriving a normalization factor for each signal in the selected set;
   reading means for applying said normalization factors to subsequently sampled sets of input rate signals,
   second memory means for receiving and storing a plurality of sets of normalized rate signals;
   first comparison means for determining when any one normalized rate signal in a given set differs from any other normalized rate signal in such set by a first predetermined amount; and
   second comparison means for determining when a normalized rate signal of a set differs from corresponding normalized rate signal of another set by a second predetermined amount.

5. The invention of claim 4 including means for deriving an average normalized rate signal for a first number of sets for each of said normalized rate signals and wherein said second comparison means determines when an average rate signal of first number of sets differs from a corresponding average rate signal of a second number of sets by a predetermined amount.

6. The invention of claim 4 wherein said calibrating means comprises
means for designating one of the selected signals as the normal signal and means for deriving a normalization factor for each selected signal equal to the ratio of the normal signal to the signal.

7. The invention of claim 4 wherein the input means further comprises means responsive to a mode signal for calibrating the selected set of stored rate signals during a coasting mode of operation.

8. The invention of claim 7 wherein the responsive means further includes means for calibrating the selected set of stored rate signal when each signal exceeds a predetermined rate.

9. The invention of claim 8 wherein the predetermined rate is ten miles per hour.

10. A wheelship control apparatus including a microprocessor comprising:
input means for receiving a rate signal from a plurality of sources;
clock means for periodically sampling the input rate signals;
memory means for storing sets of the sampled input rate signals;
error means for detecting erroneous rate signals from a source and entering an error rate signal for input rate signals from said erroneous source in said memory means;
calibrating means for selecting one set of stored signals and deriving a normalization factor for each signal in a selected set;
reading means for applying said normalization factors to subsequently sampled sets of input rate signals; and
comparison means for determining when any one normalized rate signal in a given set differs from another normalized rate signal in such set by a predetermined amount.

11. The invention of claim 10, wherein said error means includes equating means for entering a sampled input signal from a preselected signal source as an error rate signal when an erroneous rate signal is detected from corresponding source.

12. The invention of claim 11, wherein said signal sources corresponds to the axils of a vehicle and said equating means groups said signal sources by trucks on said vehicle.

13. The invention of claim 10 wherein the error means further includes
means for determining the difference between the highest and the lowest stored rate signals and
means for comparing the determined difference to a predetermined acceptable tolerance in order to detect an erroneous rate signal.

14. The invention of claim 13 further comprising means for indicating which of the stored signals are erroneous.

15. A wheelslip control apparatus including a microprocessor comprising:
input means for receiving a rate signal from a plurality of sources;
clock means for periodically sampling the input rate signals;
memory means for storing sets of the sampled input rate signals;
calibrating means for selecting one set of stored signals and deriving a normalization factor for each signal in the selected set;
reading means for applying said normalization factors to subsequently sampled sets of input rate signals;
comparison means for determining when any one normalized rate signal in a given set differs from any other normalized rate signal in such set by a predetermined amount;
a relay operable to disengage a brake of a wheel having a rate exceeding said predetermined amount; and
means for disabling the relay and thereby reapplying the brake after a predetermined time irrespective of said comparison means.

16. The invention of claim 15, wherein said relay disabling means includes means responsive to a mode signal for maintaining said relay disabling means activated to prevent release of said brake a second time until the mode signal changes.

17. The invention of claim 15 wherein the predetermined time is three seconds.

18. A wheelslip control apparatus comprising:
means for sequentially generating a set of a plurality of speed signals each of which is representative of the angular velocity of a corresponding wheel;
means for generating a signal representative of the mode of application of power to said wheels including signals representative of running, braking and coasting;
a microprocessor including an arithmetic logic unit, a random access memory, a ready only memory, and an input and output interface for receiving a plurality of signals, converting the received signals into microprocessor readable form, performing a plurality of operations based upon the received signals and information stored in its read only memory and for generating a plurality of output signals for controlling the operation of a plurality of brakes and propulsion corresponding to said plurality of wheels;
means responsive to a coasting signal for determining and storing valid speed signals of each wheel in said random access memory;
means responsive to a running or braking signal for comparing a subsequent set of valid speed signals to the plurality of corresponding stored signals and generating a synchronous slip signal for each compared corresponding speed signals which differ by a first predetermined amount;
means responsive to a running or braking signal for comparing valid speed signals within a set and generating an asynchronous slip signal for compared set speed signals which differ by a second predetermined amount; and
means responsive to said synchronous and asynchronous signals and to said mode signals for releasing the brake for a predetermined time during a braking mode and for disengaging propulsion to a wheel during a running mode.

* * * * *